Oct. 11, 1966 I. B. MARGILOFF 3,278,724

SYSTEM FOR STORING AND RETRIEVING DATA

Filed June 27, 1962

INVENTOR.
IRWIN B. MARGILOFF
BY William A. Drucker
ATTORNEY

United States Patent Office 3,278,724

Patented Oct. 11, 1966

3,278,724

SYSTEM FOR STORING AND RETRIEVING DATA

Irwin B. Margiloff, 201 E. 19th St., New York, N.Y.

Filed June 27, 1962, Ser. No. 205,728

5 Claims. (Cl. 235—61.11)

This invention relates to the storage and retrieval of information, and more particularly relates to digital information storage systems providing large storage capacity and reduced access time when searching.

In the storage for future reference of large amounts of information contained in individual works, such as in books, magazine articles or patents, this information is frequently stored in an arbitrary or chronological sequence, although it is usually necessary to retrieve the information according to subject matter. For instance, information contained in the patents owned by a large corporation is usually catalogued chronologically according to an arbitrary number system, or alphabetically according to the inventor's name, or broadly classified according to a rather general subject matter classification, but in most retrieval situations it is necessary to recover portions of the information which relate to certain very specific subjects or combinations of subjects.

Conventional storage means utilizing mechanical moving components are well known, but the limitations of these systems are quite severe and require unduly large retrieval times for processing mechanical components such as punched cards. Magnetic media such as tape and wire have relatively long access times. Magnetic drums and discs have shorter access times, but present more difficult physical handling, storage and manipulation problems.

It is a principal object of this invention to provide an improved data storage and retrieval system employing digitally encoded storage units, having essentially no moving parts, and connected in a system for presenting the results of a search of a large bank of these storage units quickly and in a visual manner.

Another object of this invention is to provide an improved data storage and retrieval system employing digitally encoded storage units operatively connected in a system having essentially no parts which move during a search, and presenting the results of a search of the system quickly and in the form of a permanent physical record.

Other objects and advantages of the invention will become apparent during the following discussion of the drawings wherein:

FIGURE 1 is a block diagram of a system according to the present invention including query signal generating means, a bank of information storage units wherein the first is shown whole and the others are broken away, plural partial tuned circuit units wherein the first is shown whole and the others are broken away, and readout units and showing a system wherein each information storage unit has its own partial tuned circuit unit which in turn is connected with its own readout unit;

Figure 1:
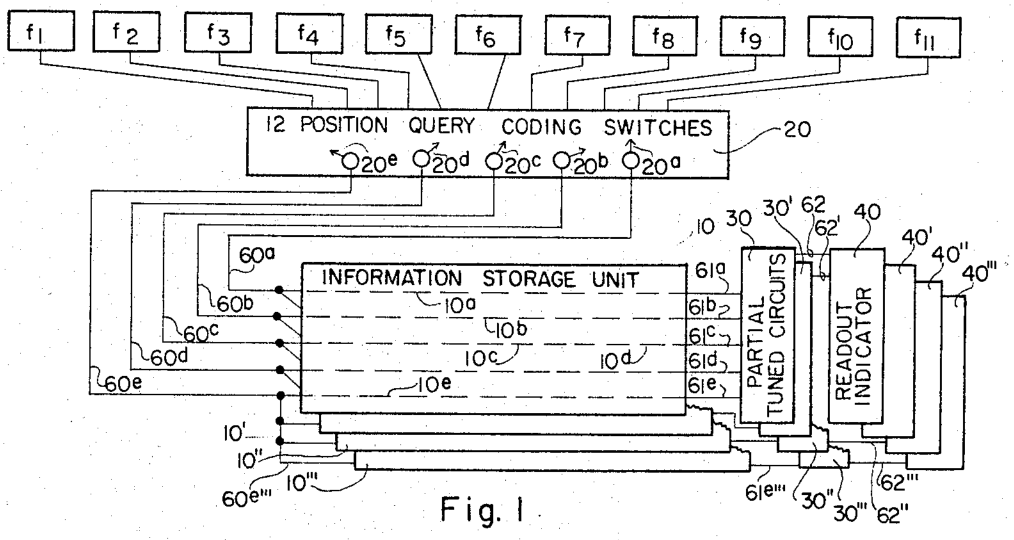

Referring now to the drawings, FIG. 1 shows an illustrative example of a system including query signal generating means comprising a plurality of oscillators *f*1 through *f*11, inclusive, connected through a set of five coding switches 20 and through query bus bars 60*a*, 60*b*, 60*c*, 60*d*, and 60*e* with a bank of information storage units 10, 10′, 10″, 10‴. For clarity, most of the connections to information storage units 10′, 10″, and 10‴, as well as to other information storage units not shown, are not shown. The inputs to all information storage units in the bank of units are connected in parallel and with the query signal bus bars leading to the storage units. These individual information storage units have their respective outputs connected to associated partial tuned circuit units 30, 30′, 30″, 30‴, by conductors 61*a*, 61*b*, 61*c*, 61*d*, 61*e*, and by similar conductors to the partial tuned circuit units numbered with primes. Each of these partial tuned circuit units is connected to an associated readout unit by a conductor, the unit 30 being connected to readout unit 40 by conductor 62, the unit 30′ to readout unit 40′ by conductor 62′, and so forth.

Figures 2, 3:
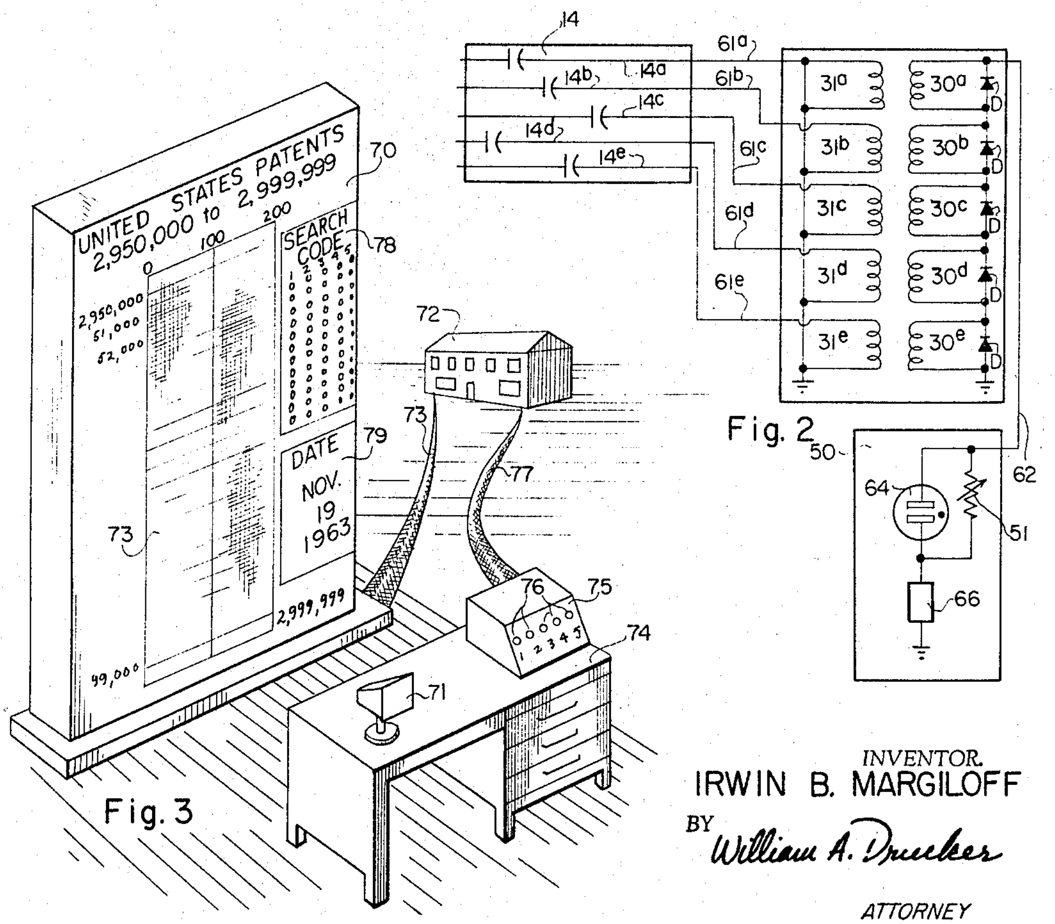
FIGURE 2 is a schematic diagram illustrating by specific embodiment a capacitive storage unit cooperating with inductances in an associated partial-tuned circuit unit and with a readout means suitable for use in connection with the system of FIGURE 1.
FIGURE 3 is an illustration of a practical readout indication board, and shows visual display means for indicating the particular location of the searched and retrieved information in the information storage system, and showing photographic means for recording the results of a search.

Referring now to FIG. 2, this figure shows a simple type of readout means in which a glow tube 64 is provided in a circuit which is connected in series with a plurality of secondary windings 30*a*, 30*b*, 30*c*, 30*d* and 30*e* across diodes D which deliver an additive D.C. potential to the glow tube. The exemplary storage unit card 14 is illustrated only schematically, and is shown as having five capacitive paths 14*a* through 14*e*. The coincidence detector glow tube 64 receives a high enough voltage from the secondary windings and diodes D to cause it to glow only if resonance is established through all of the capacitive paths taken with their complementary primary inductances 31*a* through 31*e*. Therefore, if one of the paths is non-resonant, coincidence will not be indicated by the glow tube 64 because the voltage thereacross will be too low to break it down. If all paths are resonant, the gas-filled glow tube will conduct, and can be used to operate a relay 66 by connecting the winding thereof in series with the glow tube 64 in readout unit 50. This circuit provides convenient means by which the number of limitations on the query signal can be varied.

Suppose, for example, that a certain combination of oscillators *f*1 through *f*11, in FIG. 1, is selected, but that when a bank of information storage units 14 has been searched, no card is found which experiences resonance in all paths for the various query signal frequencies respectively fed thereto. If the information were arranged on the cards so that the most important items were in the uppermost paths and items of decreasing importance appeared in the lower paths, then adjustments could be made in the readout means calibrating resistance 51 of FIG. 2 whereby on a subsequent search of the storage units resonant-path coincidence would be indicated if the first four paths 14*a*, 14*b*, 14*c* and 14*d* were resonant, regardless of whether the path 14*e* experienced resonance. If another search is made with only four requirements in order to establish coincidence, and still no storage unit was searched having these characteristics, then another path 14*d* could be dropped by switching off the oscillator corresponding therewith and readjusting the resistor 51, and a further search instituted for storage units having coincidence in only the first three rows. In this manner, successive searches can be run until the group of cards having the best information available has been found.

It will be obvious to those skilled in the art that the flexibility inherent in the use of the calibrating resistor 51 may also be obtained in other ways, e.g. through the use of a signal to a non-significant path that contains all of the possible frequencies so that the path will conduct no matter what the query is; or alternatively by supplying additional voltage from an external source to the more positive terminal of the glow tube such that the effect of conduction in one or more paths in the information storage unit is achieved without actual conduction through the path or paths. In the latter case the query bus bars to the non-significant paths need not be energized. There are other ways.

Now referring to FIGURE 3, this figure shows a readout indicator board 70 of a type constructed to utilize the glow tube readout means 50 of FIGURE 2. From each information storage unit in a large storage bank 72, which may be located at some distance from the more active site of the readout means, there is brought through a cable 73, one lead from the partial tuned circuit means, corresponding with the lead 62 in FIG. 2. On the readout board 70 there is located a matrix of fifty thousand individual glow tubes, each corresponding to an individual information storage unit in the bank. These glow tubes are in the area marked 73 and face the onlooker, but are not shown individually. The query signal generator 75 on operator's desk 74 is adjusted using five individual twelve-position switches 76 to feed one of the eleven query signal frequencies, or no signal to each of the five bus bars carried in cable 77 and thence to the information storage units in the bank 72 which information storage units have, for purposes of discussion, five paths each. Immediately upon energizing the bus bars in the cable 77, those individual storage units which conduct cooperate with their associated partial tuned circuits to break down the starting voltage of their associated glow lamps located within the area 73, and are thus shown to be coincident with the combination of frequencies in the selected query signal, that is, to contain the information sought.

In FIGURE 3, the board 70 is provided with the markings "United States Patents," and "2,950,000 to 2,999,999," indicating that it is being used to search within the designated group for United States Patents having a certain subject matter identified by the selected code represented by the particular selection of frequencies and storage-unit path positions chosen by the operator and fed to the information storage bank.

For the convenience of the operator or others who are present to scan the indicator board 73, the board is provided with coordinates ruled thereon to facilitate reading. To confirm the search query, the board is provided with a "Search Code" indicator area 78 which contains pilot lights to indicate which of the twelve possible inputs to each of the five paths is actually being used to obtain the indicated display. For a permanent record of the search, the operator may photograph the indicator board with camera 71, the date of the search being posted in area 79 for record purposes. The resulting photograph is a dated record of the search, preferably made to standard page proportions so that enlargements may be made directly and incorporated into users' files.

The additive voltage made available at the output side of the partial tuned circuit means following the information storage units in FIG. 2, may be used in several ways alone or by means of the relay 66, when optionally present. For instance, the voltage may be used to initiate a charge to produce a xerographic print, or heat means to produce a thermographic print, or to trip a camera to provide a photographic record. In each case, the arrangement of readout means will be in ordered relationship, with the relationship of the rows and/or columns of readout means being directly translatable into the identification of the corresponding information storage units. As an example of an alternative means, the recording means for recording the results of the search for the United States Patents discussed above with reference to FIGURE 3 may be altered to employ thermographic recording by replacing the individual glow tubes with individual heaters of conveniently small size mounted in rows and columns related to the patent numbers. When the query signal is imposed on the query bus bars the information storage units having coincidence with the permutation of query signal frequencies will conduct in resonance with their corresponding partial tuned circuit means to form an additive voltage high enough to directly heat, or to trigger the relay which in turn will power a heater to heat, the thermographic readout device and to produce a thermographic print when heat-sensitive paper is pressed against the heaters of the thermographic matrix. For convenience, the sheets of heat-sensitive paper would be preprinted with the type of information displayed on the visual readout board concerning date, search code, and similar coordinate alignment rulings would be used to enable the operator to convert the printed spots directly into patent numbers.

While the discussion has been in terms of patent numbers, which are arranged in a chronological sequence by the issuing agency, it can be readily seen that any cataloging system may be presented by the individual readout means associated with each information storage unit. For instance, in a large library, it may be preferred to assign each acquisition an accession number. This number would then be used to represent the acquisition for purposes of search. The library user, after recording the results of the search in terms of the accession number displayed, would then refer to a catalogue giving the call number, Library of Congress number, or other local designation used by the library for actual storage of the physical materials.

As with most systems of coded symbols, users will soon become accustomed to the form of readout and recording here described and will probably not require that it be transcribed into the more usual conventional terms of numbers.

I do not limit my invention to the exact forms shown in the drawings, for obviously changes may be made within the scope of the following claims.

I claim:

1. In a data storage and retrieval system including a plurality of separate data storage units each comprising plural signal paths having first and second ends joined by reactive circuit elements, and including query signal generating means for delivering plural oscillation frequencies, and including partial-tuned-circuit readout means coupled with the storage units and each including plural paths complementary with the respective signal paths of the storage units and at least some of the readout paths including reactances, improvements comprising:

(a) bus bar means coupling corresponding paths of the storage units in parallel at their first ends;

(b) means for selecting certain of said oscillation frequencies and for simultaneously coupling each of the selected frequencies to different ones of said bus bar means;

(c) means coupling each individual readout means to the second ends of the paths of each storage unit;

(d) a plurality of indicators each coupled with a different readout means and each responsive to simultaneous conduction of selected oscillation frequencies through plural paths of the storage unit and readout means which are associated with that indicator, and each indicator being operative to deliver an indication whenever the reactive elements of the paths are tuned by the associated reactances of the readout means to the oscillation frequencies coupled thereto; and (e) said indicators being arranged in a matrix of relative positions which are translatable into identifications of individual storage units whose paths are coupled to said indicators.

2. In combination with a system as set forth in claim 1, photographic means directed toward said matrix and operative to produce a photographic record of the indicators thereon.

3. In a system as set forth in claim 1, said query signal generating means comprising oscillators for generating a greater number of frequencies than there are signal paths in a storage unit, and said selecting means comprising switch means connected between each bus bar means and the oscillators for selecting one of said frequencies for delivery to the associated signal paths of the storage units.

4. In a system as set forth in claim 1, the reactive paths of the storage units being complementary to the reactances of the partial tuned circuit means to form composite paths resonant at various frequencies within the capability of the query signal generating means, and said readout means including means for indicating simultaneous resonance in all of the paths of an associated data storage unit at the respective frequencies being passed therethrough.

5. In a system as set forth in claim 2, said readout means comprising gas-filled glow tube means illuminated by current derived from the passage of said frequencies through multiple paths when resonant.

References Cited by the Examiner

UNITED STATES PATENTS

| | | | |
|---|---|---|---|
| 2,113,148 | 4/1938 | Weber | 340—171 |
| 2,426,947 | 9/1947 | Potts | 346—107 |
| 2,513,342 | 7/1950 | Marshall | 340—171 |
| 2,547,023 | 4/1951 | Lense et al. | 340—171 |
| 2,753,550 | 7/1956 | Treharne | 340—146.3 X |
| 2,817,828 | 12/1957 | McGuigan | 340—171 |
| 2,842,753 | 7/1958 | Ewen | 340—171 |
| 3,043,988 | 7/1962 | Hurvitz | 340—171 |
| 3,185,964 | 5/1965 | Margiloff | 340—172.5 |

MAYNARD R. WILBUR, *Primary Examiner.*

MALCOLM A. MORRISON, *Examiner.*

W. S. POOLE, D. COOK, *Assistant Examiners.*